(12) United States Patent
Abe

(10) Patent No.: US 6,424,689 B1
(45) Date of Patent: Jul. 23, 2002

(54) RADIO COMMUNICATION SYSTEM, TRANSMITTER AND RECEIVER THEREFOR

(75) Inventor: Masami Abe, Tokyo (JP)

(73) Assignee: Oki Electric Industry CO, Ltd., Tokyo (JP)

(*) Notice: Subject to any disclaimer, the term of this patent is extended or adjusted under 35 U.S.C. 154(b) by 0 days.

(21) Appl. No.: 09/198,360

(22) Filed: Nov. 24, 1998

(30) Foreign Application Priority Data

Nov. 28, 1997 (JP) .............................................. 9-328387

(51) Int. Cl.⁷ .............................. H04L 7/00; H04J 3/16; H04J 3/22; H04J 3/06
(52) U.S. Cl. ........................ 375/366; 370/470; 370/472; 370/503; 370/509
(58) Field of Search ........................ 375/366; 370/470, 370/472, 503–509

(56) References Cited

U.S. PATENT DOCUMENTS

| | | | | |
|---|---|---|---|---|
| 4,686,673 A | * | 8/1987 | Hotta ......................... | 370/104 |
| 4,757,536 A | * | 7/1988 | Szczutkowski et al. ....... | 380/48 |
| 4,803,703 A | * | 2/1989 | Deluca et al. ............... | 375/116 |
| 5,212,808 A | * | 5/1993 | Sue et al. ................... | 455/51.1 |
| 5,440,555 A | * | 8/1995 | Momona ..................... | 370/79 |
| 5,841,806 A | * | 11/1998 | Gilhousen et al. .......... | 375/206 |
| 5,870,389 A | * | 2/1999 | Hadar et al. ................ | 370/311 |

* cited by examiner

Primary Examiner—Chi Pham
Assistant Examiner—Tony Al-Beshrawi
(74) Attorney, Agent, or Firm—Rabin & Perdo, P.C.

(57) ABSTRACT

In a mobile radio communication system, a transmitter of a base station transmits broadcast information to receivers of mobile stations in the form of frames. The transmitter produces a long frame composed of a plurality of frames each including a first bit sequence and part of the broadcast information following the first bit sequence, and a second bit sequence located at the head of the long frame. Each of the first bit sequences and the second bit sequence is used for establishing synchronization between the transmitter and each of the receivers. Upon receipt of the long frame from the transmitter, the receiver establishes synchronization of the long frame based on the foregoing second bit sequence.

8 Claims, 3 Drawing Sheets

RADIO COMMUNICATION SYSTEM, TRANSMITTER AND RECEIVER THEREFOR

BACKGROUND OF THE INVENTION

1. Field of the Invention

The present invention relates to a spread spectrum radio communication system and, in particular, to a technique for synchronization acquisition carried out between a transmitter and a receiver in a spread spectrum radio communication system, particularly in a CDMA (code division multiple access) mobile radio communication system.

2. Description of the Prior Art

The CDMA mobile radio communication system includes, like other mobile radio communication systems, a base station and a plurality of mobile stations in each of service areas which are monitored and controlled by the corresponding base stations. The base station constantly broadcasts information about communications, such as a radio logical channel structure, to the mobile stations located in the corresponding service area. The broadcast information is used by the mobile stations for communications with the base station. The base station transmits the broadcast information in the form of frames. Specifically, the base station divides the broadcast information into a plurality of data units in a given order and then adds preambles between the adjacent data units so as to form the frames each composed of the preamble and the data unit. The preamble is assigned a bit sequence for synchronization acquisition which is double-spread, while the data unit is single-spread. Since each frame has the double-spread bit sequence, the reliability of the synchronization acquisition is improved.

Since each of the data units includes unique data as described above, each mobile station is required to detect a position of each frame among the frames. For achieving this, it is necessary for the mobile station to read a serial number assigned to each of the frames after establishing the synchronization acquisition. The reading of the serial number from each of the frames requires error correction decoding which necessitates complicated calculations. As a result, the mobile station takes a long time from the synchronization acquisition to the detection of a position of each of the frames.

SUMMARY OF THE INVENTION

Therefore, it is an object of the present invention to provide an improved radio communication system.

It is another object of the present invention to provide an improved transmitter to be used in the foregoing radio communication system.

It is another object of the present invention to provide an improved receiver to be used in the foregoing radio communication system.

According to one aspect of the present invention, there is provided a radio communication system comprising a transmitter and a receiver, wherein the transmitter comprises a frame producing circuit which produces a long frame comprising a plurality of frames each including a first bit sequence, and a second bit sequence located at the head of the long frame, the first bit sequences and the second bit sequence each used for establishing synchronization between the transmitter and the receiver, and wherein the receiver comprises a synchronizing circuit which establishes synchronization of the long frame based on the second bit sequence.

It may be arranged that the transmitter further comprises a first spreading circuit which double-spreads the second bit sequence, and wherein the receiver further comprises a first despreading circuit which double-despreads the double-spread second bit sequence.

It may be arranged that the transmitter further comprises a second spreading circuit which double-spreads the first bit sequence, and wherein the receiver further comprises a second despreading circuit which double-despreads the double-spread first bit sequence.

It may be arranged that the second bit sequence comprises a plurality of third bit sequences.

It may be arranged that the second bit sequence comprises a plurality of bit sequences which mutually differ from each other.

It may be arranged that the transmitter further comprises an amplifying circuit which sets a transmission power of the second bit sequence to be greater than a transmission power of the other of the long frame.

According to another aspect of the present invention, there is provided a transmitter for use in a radio communication system for communication between the transmitter and a receiver, the transmitter comprising a frame producing circuit which produces a long frame comprising a plurality of frames each including a first bit sequence, and a second bit sequence located at the head of the long frame, the first bit sequences and the second bit sequence each used for establishing synchronization between the transmitter and the receiver.

According to another aspect of the present invention, there is provided a receiver for use in a radio communication system for communication between a transmitter and the receiver, wherein the transmitter comprises a frame producing circuit which produces a long frame comprising a plurality of frames each including a first bit sequence, and a second bit sequence located at the head of the long frame, the first bit sequences and the second bit sequence each used for establishing synchronization between the transmitter and the receiver, the receiver comprising a synchronizing circuit which establishes synchronization of the long frame based on the second bit sequence.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, a radio communication system according to an embodiment of the present invention will be described hereinbelow with reference to the accompanying drawings.

Figure 1:
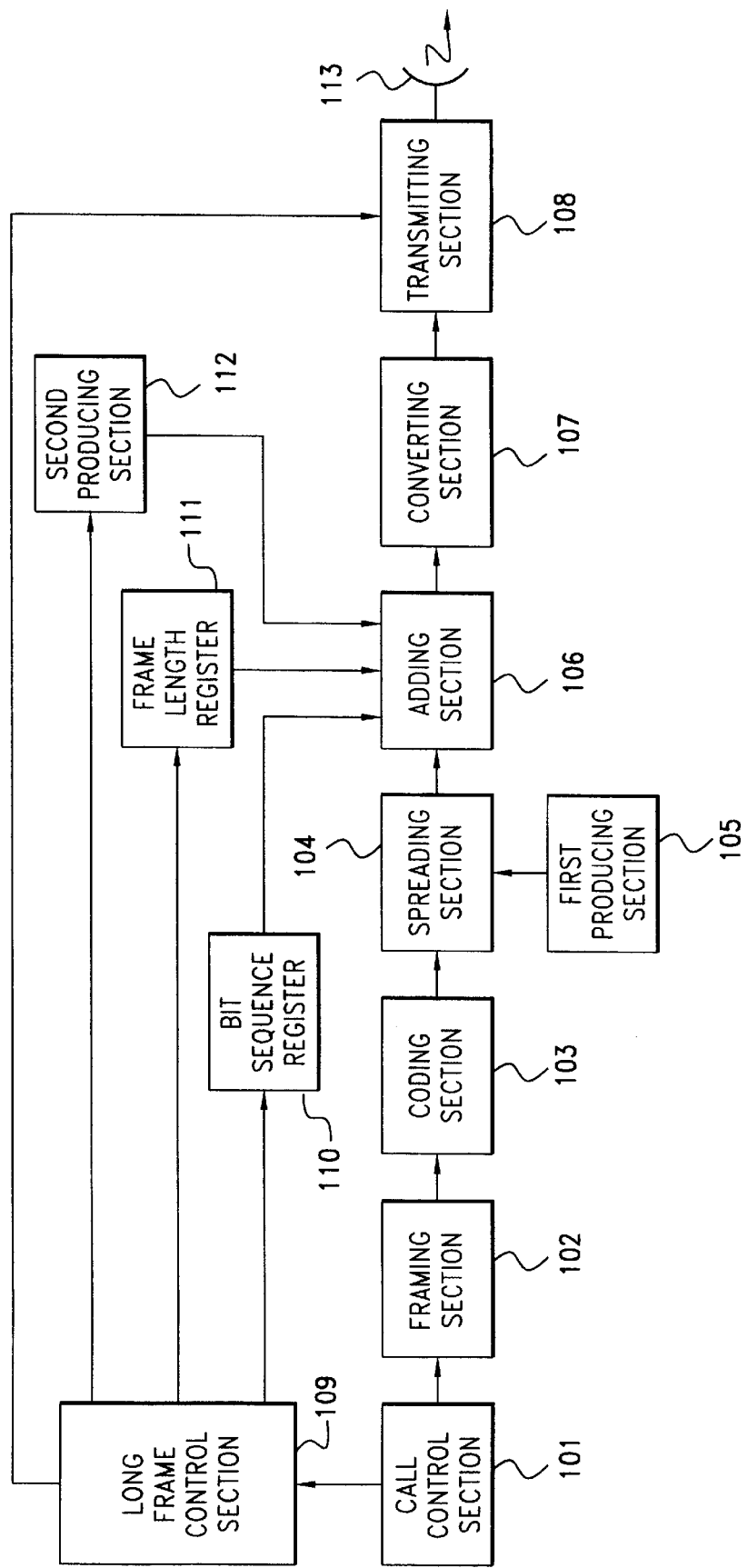
FIG. 1 is a block diagram showing a structure of a transmitter for use in a radio communication system according to an embodiment of the present invention.
Figure 2:
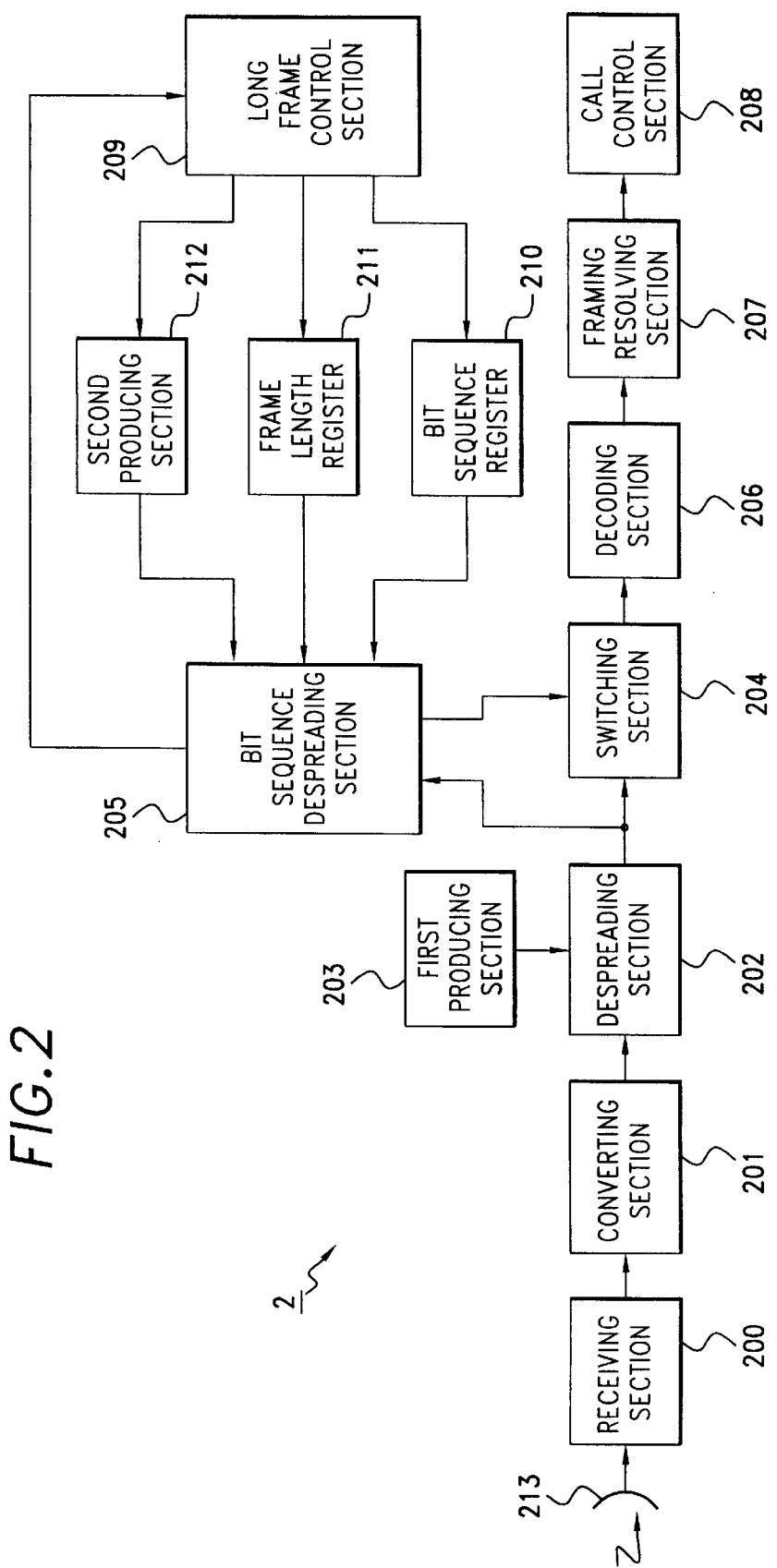
FIG. 2 is a block diagram showing a structure of a receiver for use in the radio communication system according to the embodiment of the present invention.

FIG. 1 shows a structure of a transmitter 1 of a base station in a CDMA mobile radio communication system, while FIG. 2 shows a structure of a receiver 2 of each of mobile stations in the radio communication system.

Figure 3A:
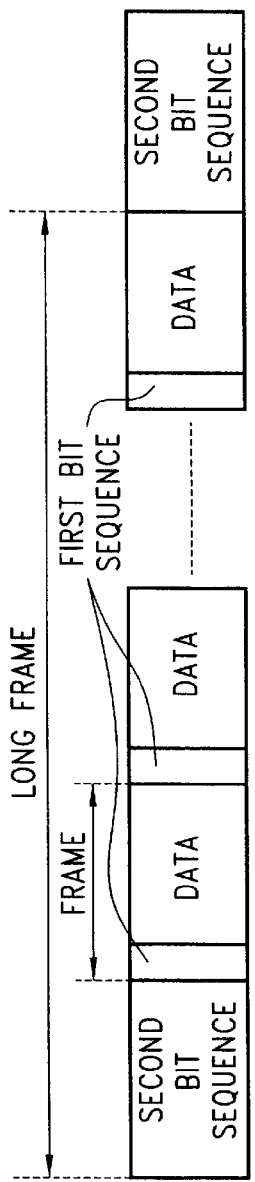
FIG. 3A is a diagram for explaining a radio frame structure according to the embodiment of the present invention.

The base station (transmitter 1) transmits broadcast information to the mobile stations (receivers 2) located in the subject service area. As shown in FIG. 3A, the broadcast information is transmitted per long frame. The long frame is composed of a plurality of frames each having a first bit sequence and a data unit, and a second bit sequence located at the head of the long frame. The first bit sequence differs from the second bit sequence and may further differ per frame. As described later, the first bit sequence and the second bit sequence are double-spread, while the data unit is single-spread. The data units of one long frame represent the whole broadcast information.

As shown in FIG. 1, the transmitter 1 comprises a call control section 101, a framing section 102, a coding section 103, a spreading section 104, a first producing section 105, an adding section 106, a converting section 107, a transmitting section 108, a long frame control section 109, a bit sequence register 110, a frame length register 111, a second producing section 112 and a transmission-reception antenna 113 which also works as an antenna for a receiver (not shown) of the base station.

The call control section 101 produces the broadcast information and feeds it to the framing section 102. The call control section 101 further notifies the long frame control section 109 about a starting phase of a long frame.

The framing section 102 divides the broadcast information into a plurality of data units in a given order for forming frames.

The coding section 103 applies error correction coding to each of the data units. In this embodiment, the coding section 103 carries out the convolutional coding.

The spreading section 104 spreads each of the error correction coded data units from the coding section 103 using a first spreading code (such as a PN code) produced at the first producing section 105. The spreading section 104 outputs each of the spread data units to the adding section 106.

The adding section 106 double-spreads a first bit sequence and a second bit sequence and adds them to the spread data units from the spreading section 104 to form a long frame for feeding to the converting section 107.

Specifically, in response to receipt of the starting phase of the long frame from the call control section 101, the long frame control section 109 controls the bit sequence register 110, the frame length register 111 and the second producing section 112 in the following manner:

The bit sequence register 110 stores the foregoing first and second bit sequences. The first or second bit sequence designated by the long frame control section 109 is set in the adding section 106.

The frame length register 111 feeds term information about the first or second bit sequence to the adding section 106 under the control of the long frame control section 109.

The second producing section 112 produces a second spreading code (such as a PN code) and a third spreading code (such as a PN code) having mutually different spreading gains. In response to a command from the long frame control section 109, the second producing section 112 produces the second or third spreading code and feeds it to the adding section 106. The second spreading code is used for double-spreading the first bit sequence, while the third spreading code is used for double-spreading the second bit sequence. The second spreading code is constituted by the foregoing first spreading code and a first unique spreading code, while the third spreading code is constituted by the foregoing first spreading code and a second unique spreading code.

When the signal from the frame length register 111 designates a term of the second bit sequence, the adding section 106 stops feeding the signal (spread data unit) from the spreading section 104 to the converting section 107, while double-spreads the second bit sequence read out from the bit sequence register 110 using the third spreading code from the second producing section 112 and outputs it to the converting section 107.

On the other hand, when the signal from the frame length register 111 designates a term of the first bit sequence, the adding section 106 stops feeding the signal (spread data unit) from the spreading section 104 to the converting section 107, while double-spreads the first bit sequence read out from the bit sequence register 110 using the second spreading code from the second producing section 112 and outputs it to the converting section 107.

Further, when the signal from the frame length register 111 designates a term of the data unit, the adding section 106 feeds the signal (data unit) from the spreading section 104, which is buffered in a built-in buffer, to the converting section 107.

In the foregoing manner, the long frames shown in FIG. 3A are produced successively.

The converting section 107 increases the frequency of the long frame outputted from the adding section 106 to a radio frequency (RF) band. The transmitting section 108 amplifies the RF signal from the converting section 107. The amplified RF signal is then radiated toward the mobile stations (receivers 2) via the transmission-reception antenna 113.

As shown in FIG. 2, the receiver 2 comprises a transmission-reception antenna 213 which also works as an antenna for a transmitter (not shown) of the mobile station, a receiving section 200, a converting section 201, a re-spreading or despreading section 202, a first producing section 203, a switching section 204, a bit sequence despreading section 205, a decoding section 206, a frame resolving section 207, a call control section 208, a long frame control section 209, a bit sequence register 210, a frame length register 211 and a second producing section 212.

The antenna 213 receives the long frame in the form of the RF signal transmitted from the transmitter 1. The receiving section 200 amplifies the received long frame. The converting section 201 demodulates the amplified long frame to the state just prior to the frequency conversion carried out at the converting section 107 in the transmitter 1. The despreading section 202 despreads the demodulated long frame using a spreading code produced at the first producing section 203. The first producing section 203 is constituted by a matched filter or a sliding correlator. The spreading code produced at the first producing section 203 is identical with the foregoing first spreading code used in the transmitter 1.

The bit sequence despreading section 205 further despreads the second bit sequence of the long frame based on a spreading code produced at the second producing section 212 and the second bit sequence stored in the bit sequence register 210 so as to establish the synchronization acquisition of the long frame. The spreading code used for despreading the second bit sequence at the bit sequence despreading section 205 is identical with the foregoing second unique spreading code of the third spreading code used in the transmitter 1.

After the establishment of the synchronization acquisition of the long frame, the bit sequence despreading section 205 despreads the first bit sequences, in turn, of the respective frames in the long frame using a spreading code produced at the second producing section 212. The spreading code used for despreading the first bit sequences at the bit sequence despreading section 205 is identical with the foregoing first unique spreading code of the second spreading code used in the transmitter 1. After despreading each of the first bit sequences, the bit sequence despreading section 205 compares the despread first bit sequence in the long frame with the first bit sequence stored in the bit sequence register 210. When both agree with each other, the bit sequence despreading section 205 detects the border between the first and second bit sequences or between the adjacent frames in the long frame. Since the second bit sequence is assigned at the head of the long frame, the adjacent frame is recognized as the first frame. Accordingly, by establishing the synchronization acquisition of the long frame, the bit sequence despreading section 205 can detect the first frame immediately. Further, the bit sequence despreading section 205 can immediately identify a position of a desired frame based on a frame length and a long frame length stored in the frame length register 211. In this fashion, by establishing the synchronization acquisition of the long frame using the second bit sequence in the long frame, the mobile station can immediately identify a position of each frame.

More specifically, the bit sequence register 210 stores the foregoing first and second bit sequences one of which is set at the bit sequence despreading section 205 under the control of the long frame control section 209. The frame length register 211 feeds term information about the first or second bit sequence to the bit sequence despreading section 205 under the control of the long frame control section 209. The second producing section 212 produces the foregoing first or second unique spreading code under the control of the long frame control section 209 and feeds it to the bit sequence despreading section 205.

The bit sequence despreading section 205 is constituted by a matched filter or a sliding correlator. The first or second unique spreading code produced at the second producing section 212 is set in the bit sequence despreading section 205. The bit sequence despreading section 205 derives correlation values between the despread signal from the despreading section 202 and the first or second unique spreading code. When a pattern obtained with the greatest correlation value as a result of the despreading at the bit sequence despreading section 205 agrees with the first or second bit sequence set in the bit sequence despreading section 205, the bit sequence despreading section 205 notifies it to the long frame control section 209. The bit sequence despreading section 205 opens the switching section 204 during a term of the first or second bit sequence, while closes it during a term of the error correction coded data unit of the long frame. Accordingly, each of the error correction coded data units of the long frame is allowed to be fed from the despreading section 202 to the decoding section 206 via the switching section 204.

The switching section 204 is normally open and controlled by the bit sequence despreading section 205 as described above.

The decoding section 206 applies error correction decoding to each of the error correction coded data units from the switching section 204. Then, the frame resolving section 207 resolves the data units so as to reconstruct the broadcast information. The call control section 208 analyzes the broadcast information and carries out given processes depending on necessity in a known manner.

As described above, according to the radio communication system in this embodiment, the synchronization acquisition of the long frame composed of the plurality of frames and the second bit sequence is carried out using the second bit sequence. Since the second bit sequence is located at the head of the long frame, the first frame in the long frame can be identified through detection of the second bit sequence. Accordingly, as described above, a position of each of the frames in the long frame can be immediately identified by establishing the synchronization acquisition of the long frame.

In the foregoing embodiment, the second bit sequence is constituted by one bit sequence. However, in this case, if the synchronization acquisition based on the second bit sequence in one long frame fails, it is necessary to await the second bit sequence in a subsequent long frame. Accordingly, the failure in synchronization acquisition causes waste of a long time before establishing the synchronization acquisition.

Figure 3B:
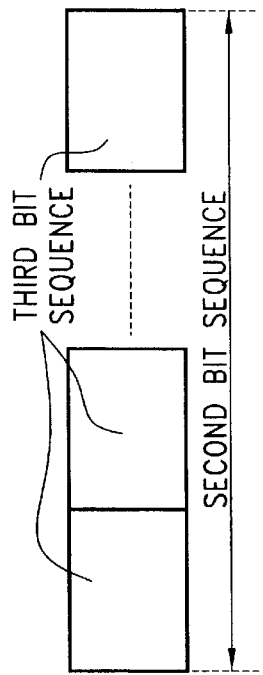
FIG. 3B is a diagram for explaining a radio frame structure according to a modification of the radio frame structure shown in FIG. 3A.

In view of this, it is preferable that the second bit sequence is constituted by a plurality of third bit sequences as shown in FIG. 3B. With this arrangement, even if the synchronization acquisition based on one of the third bit sequences fails, the synchronization acquisition based on subsequent one of the third bit sequences can be immediately carried out. Thus, a time required for establishing the synchronization acquisition can be shortened.

Figure 3C:
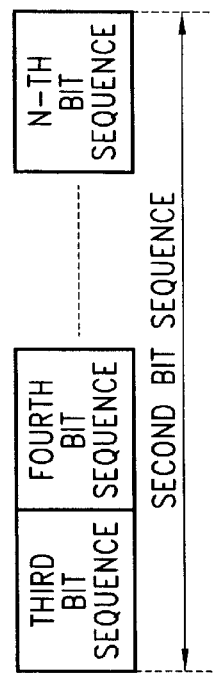
FIG. 3C is a diagram for explaining a radio frame structure according to a modification of the radio frame structure shown in FIG. 3B.

For precisely deriving a position of each frame after the establishment of the synchronization acquisition, it is preferable that the second bit sequence is constituted by a third bit sequence, a fourth bit sequence . . . and an N-th bit sequence which mutually differ from each other as shown in FIG. 3C. For example, in the structure shown in FIG. 3B, it is difficult to identify which of the third bit sequences has established the synchronization acquisition. On the other hand, in the structure shown in FIG. 3C, it can be immediately identified which of the third to N-th bit sequences has established the synchronization acquisition so that a position of each frame can be precisely designated based on a position of that bit sequence.

Figure 3D:
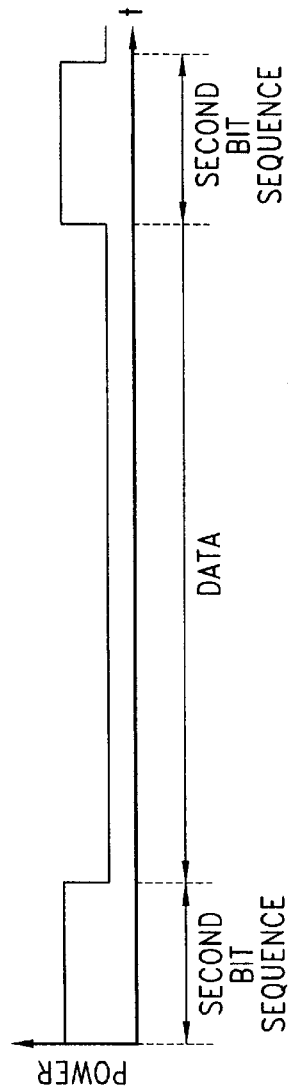
FIG. 3D is a diagram for explaining an example of the transmission power for transmitting a long frame obtained according to the embodiment of the present invention.

In the foregoing embodiment, the transmitting section 108 transmits the RF long frames at the constant transmission power. Since the second bit sequence (and also the first bit sequences) is double-spread, the processing gain is great. Accordingly, it is not liable to be influenced by noise due to interference or the like. However, for further enhancing the reliability, it is preferable that the transmitting section 108 increases the transmission power with respect to only the second bit sequences as shown in FIG. 3D.

In the foregoing embodiment, it is arranged that one long frame represents the whole broadcast information. However, the whole broadcast information may be represented by a plurality of long frames.

While the present invention has been described in terms of the preferred embodiments, the invention is not to be limited thereto, but can be embodied in various ways without departing from the principle of the invention as defined in the appended claims.

What is claimed is:

1. A radio communication system comprising a transmitter and a receiver, wherein the transmitter comprises:

a long frame producing circuit that produces a long frame including a plurality of consecutive given length frames each having data to be transmitted to the receiver, and a bit sequence that is located at the head of the long frame, which serves to establish a synchronization between the transmitter and the receiver, and indicates the position of a first frame of the plurality of frames; and a transmitting circuit that transmits the long frame produced by the long frame producing circuit to the receiver; and wherein the receiver comprises:

a receiving circuit that receives the long frame from the transmitter;

a register circuit that stores the length of each of the plurality of frames;

a synchronizing circuit that establishes synchronization of the long frame based on the bit sequence in the long frame received by the receiving circuit;

a detecting circuit that detects the position of the first frame in the long frame synchronized by the synchronizing circuit; and an identifying circuit that identifies the position of each of the plurality of frames in the long frame based on the position of the first frame in the long frame detected by the detecting circuit, and the length of each frame stored in the register circuit.

2. A radio communication system according to claim 1, wherein each of the plurality of frames further has a preamble for the data in the frame.

3. The radio communication system according to claim 2, wherein the transmitter further comprises a first spreading circuit, which double-spreads the bit sequence, and wherein the receiver further comprises a first despreading circuit, which double-despreads the double-spread bit sequence.

4. The radio communication system according to claim 3, wherein the transmitter further comprises a second spreading circuit, which double-spreads the preamble, and wherein the receiver further comprises a second despreading circuit, which double-despreads the double-spread preamble.

5. The radio communication system according to claim 3, wherein the bit sequence comprises a plurality of bit sequences that are similar to each other.

6. The radio communication system according to claim 3, wherein the bit sequence comprises a plurality of bit sequences that are different from each other.

7. The radio communication system according to claim 3, wherein the transmitter further comprises an amplifying circuit, which sets a transmission power of the bit sequence to be greater than a transmission power of the rest of the long frame.

8. A receiver for use in a radio communication system, comprising:

a receiving circuit that receives a long frame including a plurality of consecutive given length frames each having data to be received, and a bit sequence that is located at the head of the long frame, which serves to establish a synchronization, and indicates the position of a first frame of the plurality of frames;

a register circuit that stores the length of each of the plurality of frames;

a synchronizing circuit that establishes synchronization of the long frame based on the bit sequence in the long frame received by the receiving circuit;

a detecting circuit that detects the position of the first frame in the long frame synchronized by the synchronizing circuit; and an identifying circuit that identifies the position of each of the plurality of frames in the long frame based on the position of the first frame in the long frame detected by the detecting circuit and the length of each frame stored in the register circuit.

* * * * *